(12) United States Patent
Hadani et al.

(10) Patent No.: US 10,666,479 B2
(45) Date of Patent: May 26, 2020

(54) PILOT PACKING USING COMPLEX ORTHOGONAL FUNCTIONS

(71) Applicant: Cohere Technologies, Inc., Santa Clara, CA (US)

(72) Inventors: Ronny Hadani, Santa Clara, CA (US); Shlomo Selim Rakib, Santa Clara, CA (US); Anton Monk, Santa Clara, CA (US); Michail Tsatsanis, Santa Clara, CA (US); Yoav Hebron, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 53 days.

(21) Appl. No.: 15/779,796

(22) PCT Filed: Dec. 9, 2016

(86) PCT No.: PCT/US2016/065961
§ 371 (c)(1),
(2) Date: May 29, 2018

(87) PCT Pub. No.: WO2017/100666
PCT Pub. Date: Jun. 15, 2017

(65) Prior Publication Data
US 2019/0342136 A1 Nov. 7, 2019

Related U.S. Application Data

(60) Provisional application No. 62/265,381, filed on Dec. 9, 2015.

(51) Int. Cl.
*H04L 27/26* (2006.01)
*H04B 7/01* (2006.01)
*H04L 5/00* (2006.01)

(52) U.S. Cl.
CPC .......... *H04L 27/2613* (2013.01); *H04B 7/01* (2013.01); *H04L 5/0051* (2013.01); *H04L 27/2639* (2013.01); *H04L 27/2697* (2013.01)

(58) Field of Classification Search
None
See application file for complete search history.

(56) References Cited

U.S. PATENT DOCUMENTS

| 4,754,493 A | 6/1988 | Coates |
| 5,083,135 A | 1/1992 | Nagy et al. |

(Continued)

FOREIGN PATENT DOCUMENTS

| CN | 1235720 A | 11/1999 |
| CN | 101682316 A | 3/2010 |

(Continued)

OTHER PUBLICATIONS

Office Action for U.S. Appl. No. 13/117,119, dated Aug. 5, 2013, 5 pages.

(Continued)

*Primary Examiner* — Steven H Nguyen
(74) *Attorney, Agent, or Firm* — Perkins Coie LLP

(57) ABSTRACT

A wireless communication method includes generating a pilot signal that is represented using a complex exponential signal having a first linear phase in a time dimension and a second linear phase in a frequency dimension; and transmitting the pilot signal over a wireless communication channel using transmission resources that are designated for pilot signal transmission in a legacy transmission network such as a Long Term Evolution (LTE) network.

15 Claims, 20 Drawing Sheets

(56) References Cited

U.S. PATENT DOCUMENTS

| | | |
|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,010,048 B1 | 3/2006 | Shattil |
| 7,327,812 B2 | 2/2008 | Auer |
| 7,392,018 B1 | 6/2008 | Ebert et al. |
| 7,689,049 B2 | 3/2010 | Monro |
| 7,773,685 B2 | 8/2010 | Tirkkonen et al. |
| 7,864,877 B2 | 1/2011 | Hottinen |
| 8,194,768 B1 * | 6/2012 | Lee .................. H04L 25/022 375/261 |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,717,210 B2 | 5/2014 | Eldar et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,668,148 B2 | 5/2017 | Hadani et al. |
| 9,712,354 B2 | 7/2017 | Hadani et al. |
| 9,729,281 B2 | 8/2017 | Hadani et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0072254 A1 | 4/2003 | Ma et al. |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0131110 A1 | 7/2004 | Alard et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsket et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2006/0133381 A1 | 6/2006 | Wang |
| 2006/0276143 A1 | 12/2006 | Anglin, Jr. |
| 2007/0014272 A1 | 1/2007 | Palanki et al. |
| 2007/0036066 A1 | 2/2007 | Thomas et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2007/0285308 A1 | 12/2007 | Bauregger et al. |
| 2008/0043857 A1 | 2/2008 | Dias et al. |
| 2008/0117999 A1 | 5/2008 | Kadous et al. |
| 2008/0137788 A1 | 6/2008 | Bang |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0257520 A1 | 10/2009 | Lin et al. |
| 2009/0262844 A1 | 10/2009 | Honta |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0150225 A1 | 6/2010 | Wredenhagen |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216682 A1 | 9/2011 | Xu et al. |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Rius et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0269232 A1 | 10/2012 | Hiscock |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0156124 A1 | 6/2013 | Wang et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |

(56) References Cited

U.S. PATENT DOCUMENTS

| | | |
|---|---|---|
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0269357 A1 | 9/2014 | Dhakal et al. |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2018/0013592 A1 | 1/2018 | Liu et al. |

FOREIGN PATENT DOCUMENTS

| | | |
|---|---|---|
| CN | 101939935 A | 1/2011 |
| EP | 1432168 A1 | 6/2004 |
| EP | 3378187 A1 | 9/2018 |
| EP | 3387748 A1 | 10/2018 |
| JP | 2011127910 | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2014126519 | 8/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |

OTHER PUBLICATIONS

Notice of Allowance for U.S. Appl. No. 13/117,119, dated Feb. 28, 2014, 13 pages.
Banelli, P. et al., "Modulation Formats and Waveforms for 5G Networks: Who Will Be the Heir of OFDM?," IEEE Signal Processing Magazine, vol. 81, pp. 80-93, Nov. 2014.
El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.
Rusek, F. et al., "Scaling Up MIMO, Opportunities and Challenges with Very Large Arrays," IEEE Signal Processing Magazine, pp. 40-60 (2013).
Vodafone, "Cellular Internet of Things: Architectural Aspects," RP-150869, 3GPP RAN#68, Malmo, Sweden (Jun. 9, 2015), 19 pages.
Supplementary European Search Report for European Application No. 11787483.4, dated Sep. 9, 2014, 6 pages.
International Search Report and Written Opinion for International Application No. PCT/US2011/038302, dated Nov. 15, 2011, 8 pages.
International Preliminary Report on Patentability for International Application No. PCT/US2011/038302, dated Dec. 4, 2012, 7 pages.
Office Action for U.S. Appl. No. 13/117,124, dated Feb. 22, 2013, 7 pages.
Notice of Allowance for U.S. Appl. No. 13/117,124, dated Aug. 8, 2013, 10 pages.
Office Action for U.S. Appl. No. 14/605,957, dated Jun. 22, 2017, 6 pages.
Supplementary European Search Report for European Application No. 13809004.8, dated Apr. 14, 2016, 8 pages.
Communication Pursuant to Article 94(3) EPC for European Application No. 13809004.8, dated Feb. 17, 2017, 5 pages.
Notice of Allowance for U.S. Appl. No. 13/927,087, dated Feb. 25, 2015, 9 pages.
Office Action for U.S. Appl. No. 13/927,087, dated Nov. 12, 2014, 14 pages.
Surevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).
International Search Report and Written Opinion for International Application No. PCT/US2013/047723, dated Oct. 29, 2013, 17 pages.
International Preliminary Report on Patentability for International Application No. PCT/US2013/047723, dated Dec. 31, 2014, 15 pages.
Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.
Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.
Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Examination Report No. 1 for Australian Application No. 2013239970, dated Dec. 8, 2015, 3 pages.
"AT&T Annual Report 2014," Opening Our Network [Online]. Retrieved from the Internet: Sep. 22, 2016. <URL: http://www.att.

(56) References Cited

OTHER PUBLICATIONS com/Investor/ATT_Annual/2014/att_introduces_new_concepts_for_telecom_network.html>, 5 pages.
CATT, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.
International Search Report and Written Opinion for International Application No. PCT/US2017/025797, dated Jun. 21, 2017, 6 pages.
International Search Report and Written Opinion for International Application No. PCT/US2016/030259, dated Aug. 4, 2016, 13 pages.
Office Action for U.S. Appl. No. 15/152,464, dated Apr. 6, 2017, 10 pages.
Examination Report No. 1 for Australian Application No. 2013280487, dated May 2, 2016, 3 pages.
International Search Report and Written Opinion for International Application No. PCT/US2016/031928, dated Oct. 7, 2016, 10 pages.
Office Action for U.S. Appl. No. 15/188,946, dated May 8, 2017, 14 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
Office Action for U.S. Appl. No. 15/194,494, dated May 5, 2017, 16 pages.
International Search Report and Written Opinion for International Application No. PCT/US2016/039662, dated Nov. 29, 2016, 14 pages.
Office Action for U.S. Appl. No. 15/436,653, dated Jun. 2, 2017, 10 pages.
Office Action for U.S. Appl. No. 15/208,545, dated Aug. 21, 2017, 15 pages.
International Search Report and Written Opinion for International Application No. PCT/US2016/041940, dated Oct. 20, 2016, 8 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.
International Search Report and Written Opinion for PCT Application No. PCT/US2016/065961, dated Feb. 24, 2017, 10 pages.
International Search Report and Written Opinion for PCT Application No. PCT/US2017/019376, dated May 5, 2017, 11 pages.
Cohere, 5G Air Interface Waveforms, 3GPP RAN Workshop on 5G, Phoneix, US, Sep. 17-18, 2015, 10 pahes.
Extended European Search Report for European Patent Application No. 16873982.9, dated Sep. 9, 2019, 8 pages.
Extended European Search Report for European Patent Application No. 17757313.6, dated Nov. 11, 2019, 11 pages.

* cited by examiner

| Antenna port $p$ | $[\bar{w}_p(0)\ \bar{w}_p(1)\ \bar{w}_p(2)\ \bar{w}_p(3)]$ |
|---|---|
| 7  | $[+1\ +1\ +1\ +1]$ |
| 8  | $[+1\ -1\ +1\ -1]$ |
| 9  | $[+1\ +1\ +1\ +1]$ |
| 10 | $[+1\ -1\ +1\ -1]$ |
| 11 | $[+1\ +1\ -1\ -1]$ |
| 12 | $[-1\ -1\ +1\ +1]$ |
| 13 | $[+1\ -1\ -1\ +1]$ |
| 14 | $[-1\ +1\ +1\ -1]$ |

FIG. 15

PILOT PACKING USING COMPLEX ORTHOGONAL FUNCTIONS

PRIORITY CLAIM

This patent document is a 371 National Phase Application of PCT Application No. PCT/US2016/065961 entitled "Pilot Packing Using Complex Orthogonal Functions", filed on Dec. 9, 2016 which claims the benefit of priority of U.S. Provisional Patent Application No. 62/265,381 entitled "Pilot Packing Using Complex Orthogonal Functions," filed on Dec. 9, 2015. The entire contents of the before-mentioned patent applications are incorporated by reference as part of the disclosure of this document.

TECHNICAL FIELD

The present document relates to wireless communication, and more particularly, to modulation and demodulation of wireless signals.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses techniques that can be used to improve usefulness of pilot signals used in wireless communication systems.

In one example aspect, a method for wireless transmission is disclosed. The method includes generating a pilot signal that is represented using a complex exponential signal having a first linear phase in a time dimension and a second linear phase in a frequency dimension and transmitting the pilot signal over a wireless communication channel using transmission resources that are designated for pilot signal transmission in a legacy transmission network. In addition, a transmission apparatus that implements the method is disclosed.

In another example aspect a method for receiving wireless signals is disclosed. The method includes receiving a pilot signal that is represented using a complex exponential signal having a first linear phase in a time dimension and a second linear phase in a frequency dimension; wherein the pilot signal is transmitted over a wireless communication channel using transmission resources that are designated for pilot signal transmission in a legacy transmission network and processing the received pilot signal to perform channel recovery and interference suppression. In addition, a reception apparatus that implements the method is disclosed.

DESCRIPTION OF THE DRAWINGS

Drawings described herein are used to provide a further understanding and constitute a part of this application. Example embodiments and illustrations thereof are used to explain the technology rather than limiting its scope.

FIG. 15 shows a tabular example of orthogonal codes assigned to antenna ports.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

The present-day wireless technologies are expected to fall short in meeting the rising demand in wireless communications. Many industry organizations have started the efforts to standardize next generation of wireless signal interoperability standards. The 5th Generation (5G) effort by the 3rd Generation Partnership Project (3GPP) is one such example and is used throughout the document for the sake of explanation. The disclosed technique could be, however, used in other wireless networks and systems.

Section headings are used in the present document to improve readability of the description and do not in any way limit the discussion to the respective sections only.

Figure 1:
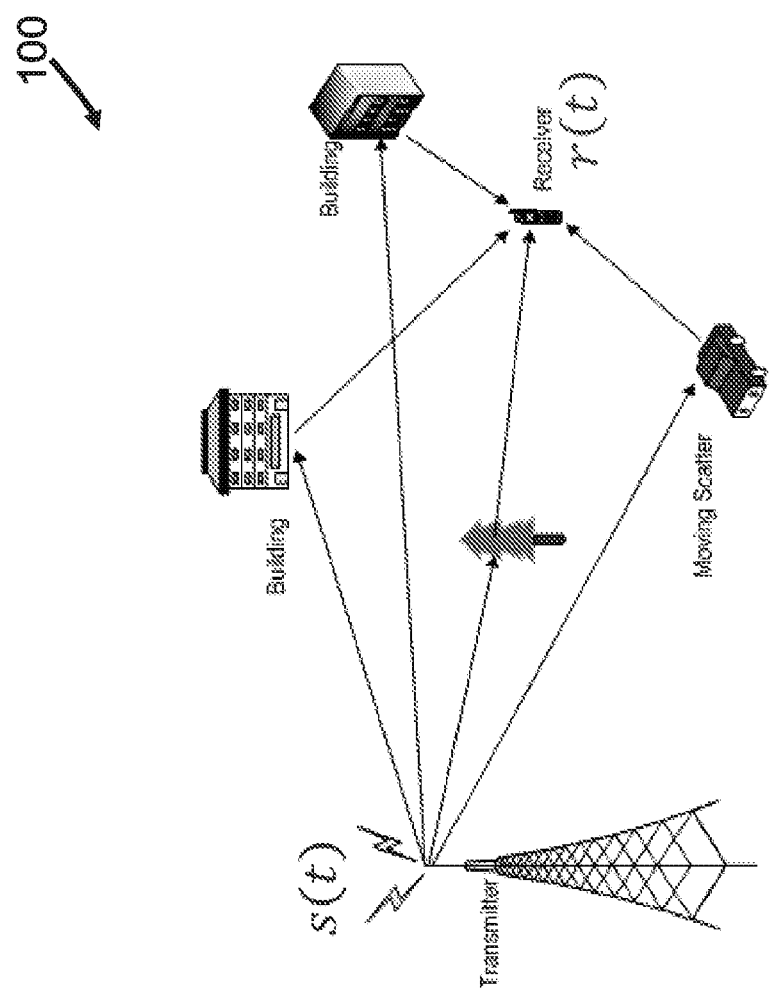
FIG. 1 shows an example communication network.

FIG. 1 shows an example communication network 100 in which the disclosed technologies can be implemented.

Current wireless communications system, e.g., Long Term Evolution (LTE) systems, suffer from certain shortcomings in the use of pilot signals. For example, using the current pilot signal transmission and reception techniques, antenna ports cannot be multiplexed across the frequency domain and antenna multiplexing in time domain is possible only for low mobility of user equipment (UE).

The presently disclosed techniques can overcome these problems, and others. This document provides description for pilot signal generation, transmission and reception in wireless networks.

OTFS Based Reference Signals

In general, OTFS based reference signals may be sent separately from the data. The idea is that the reference signals can be sent on a time-frequency lattice which is coarser than the data lattice.

Assume the time-frequency (t-f) lattice of the data is defined by the following discrete points:

$$\Lambda_{t,f}^D = \mathbb{Z} dt \oplus \mathbb{Z} df = \{(Kdt, Ldf): K, L \in \mathbb{Z}\} \quad (1)$$

The t-f lattice for the reference signals (pilots) will be a subset of the data lattice:

$$\Lambda_{t,f}^P = \mathbb{Z} Ndt \oplus \mathbb{Z} Mdf \, N, M \geq 1 \quad (2)$$

The Delay-Doppler ($\tau$, $\nu$) tori associated with the two lattices can be:

Data Torus with Circumferences:

$$C_\tau^D = 1/df$$

$$C_\nu^D = 1/dt$$

Pilot Torus with Circumferences:

$$C_\tau^P = 1/(Mdf)$$

$$C_\nu^P = 1/(Ndt)$$

Figure 2:
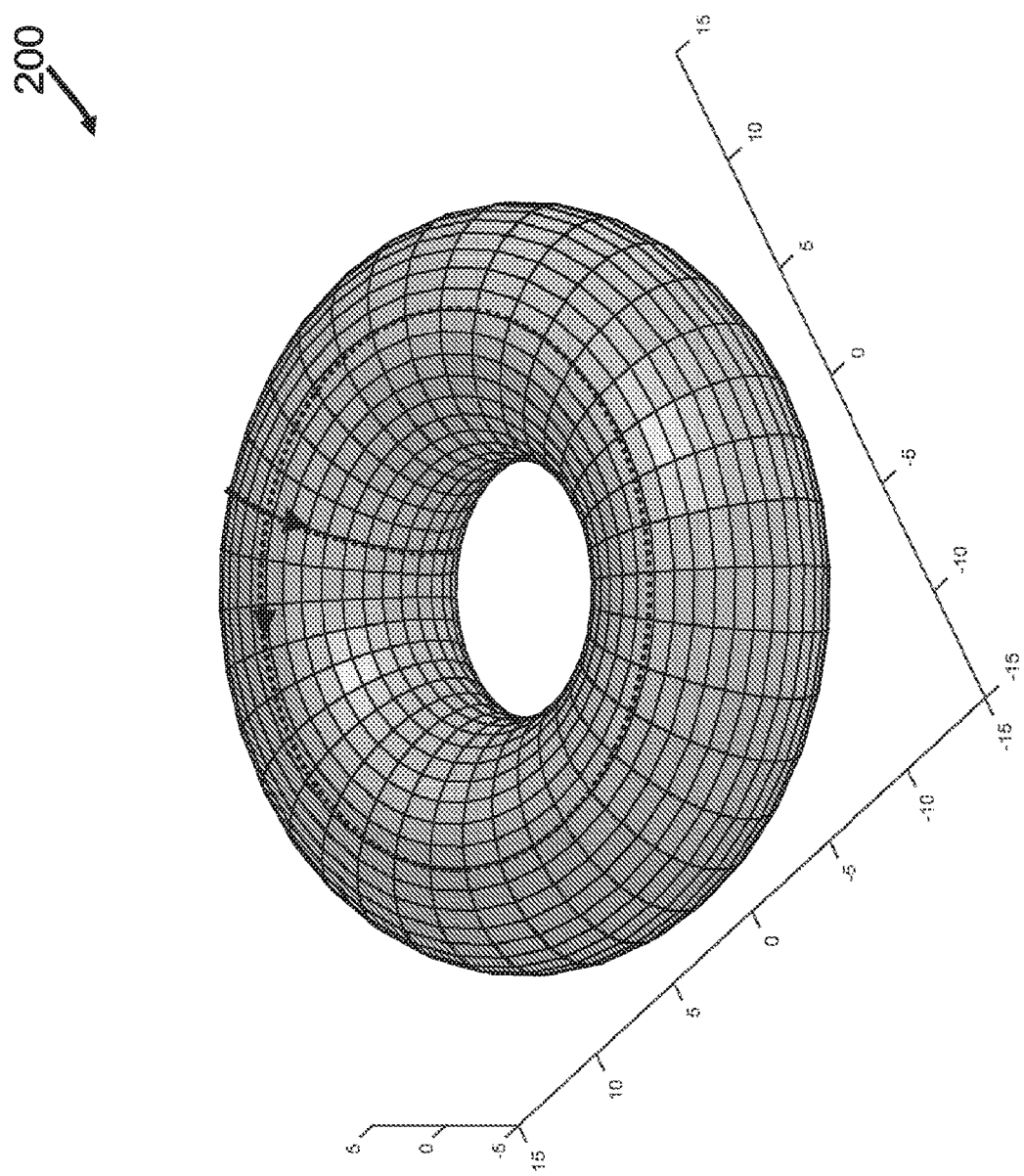
FIG. 2 illustrates an example of a torus with a larger delay circumference than Doppler circumference.

An example of a torus 200 is shown in FIG. 2.

It can be shown that a function X[K,L] on the t-f lattice defined in (1) can be transformed to a 2-D continuous, periodic function on the associated torus using a symplectic discrete Fourier transform defined as:

$$x(\tau,\nu) = \text{SDFT}(X[K,L]) \triangleq \Sigma_{K,L} X[K,L] e^{-j2\pi(\nu Kdt - \tau Ldf)} \quad (3)$$

The inverse transform of $x(\tau,\nu)$ to X[K,L] is an inverse symplectic Fourier transform defined as:

$$X[K, L] = SDFT^{-1}(x(\tau, \nu)) \triangleq \frac{1}{dtdf} \int_0^{\frac{1}{df}} \int_0^{\frac{1}{dt}} x(\tau, \nu) e^{j2\pi(\nu Kdt - \tau Ldf)} d\nu d\tau \quad (4)$$

Limiting the data and pilot lattices to the 2-D discrete intervals k×l and n×m respectively:

$$(\Lambda_{t,f}^D)_{k,l} = [0:k-1]dt \oplus [0:l-1]df \quad (6)$$

$$(\Lambda_{t,f}^P)_{n,m} = [0:n-1]Ndt \oplus [0:m-1]Mdf \quad (7)$$

translates to uniformly sampling the respective tori to k×l and n×m samples. These sampled tori create lattices that are reciprocal to their associated lattices in the t-f plane and are defined as follows:

$$\Lambda_{\tau,\nu}^D = (\Lambda_{t,f}^D)^\perp = \mathbb{Z}/df \oplus \mathbb{Z}/dt = \left\{\left(K\frac{1}{df}, L\frac{1}{dt}\right): K, L \in \mathbb{Z}\right\} \text{ and} \quad (8)$$

$$\Lambda_{\tau,\nu}^P = (\Lambda_{t,f}^P)^\perp = \mathbb{Z}/Ndf \oplus \mathbb{Z}/Mdt \, N, M \geq 1 \quad (9)$$

Figure 3:
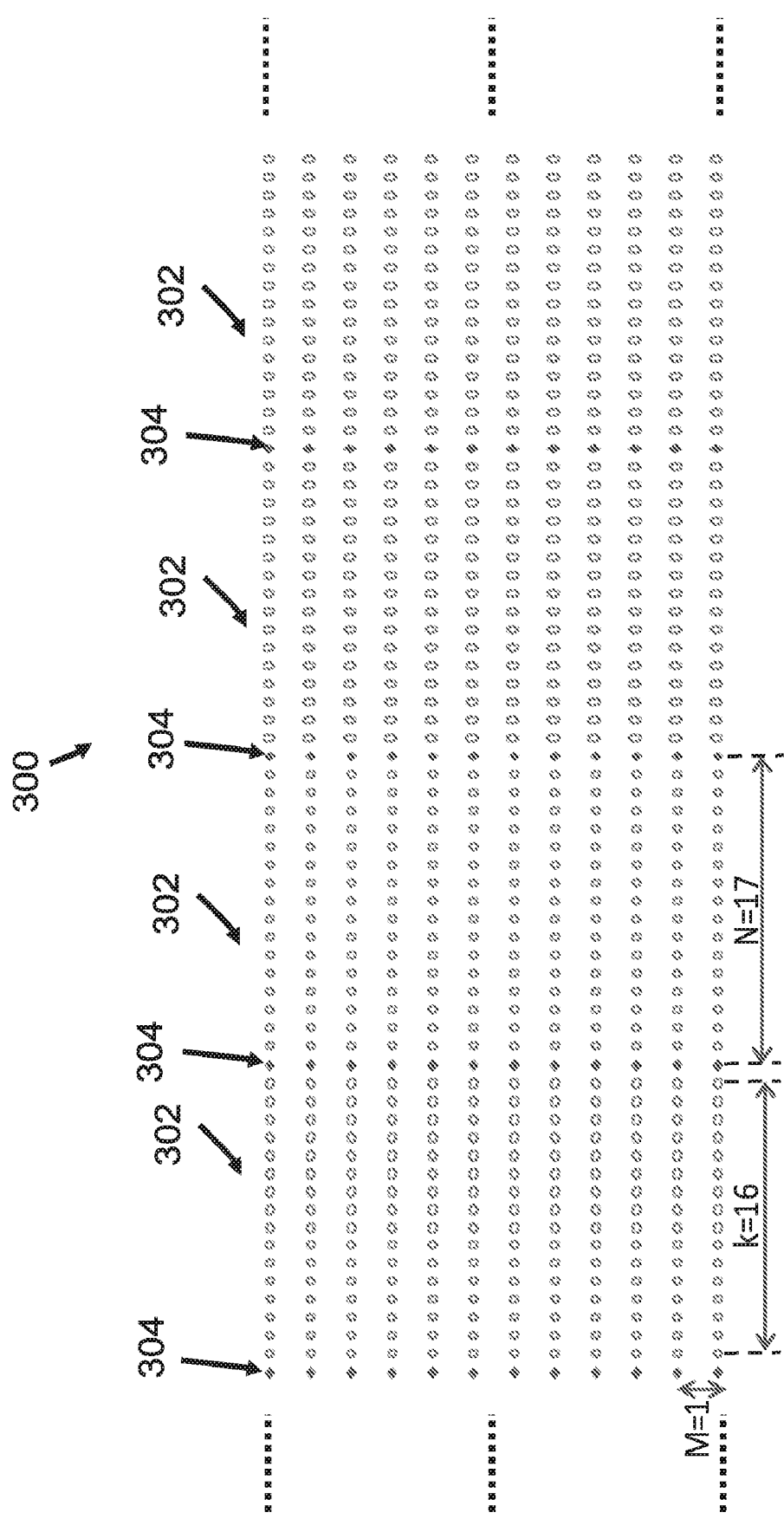
FIG. 3 shows an example configuration in the t-f Plane of Pilot and Data where pilot samples are used at every frequency point and every 17th time point of the t-f plane, and where data samples occupy all the remaining t-f plan points.

When choosing k=N–1, M=1, and 1=m, the t-f plane will look as shown in FIG. 3.

FIG. 3 shows a 2-D resource allocation 300 in which data lattice 302 and pilot lattice 304 occupy the t-f plane.

A reference signal can be viewed as a symplectic exponential restricted to a subset of points in the data lattice. If this subset is regular (i.e. forms a sub-lattice) the reference signal is considered structured, otherwise it is considered non-structured.

Examples of 2-D Structured Reference Signals

2-D structured reference signals are pilots that are generated on the Delay-Doppler plane which is associated with a sub-lattice of the data lattice (N>1, M≥1). These pilots are multiplexed in the t-f domain with the data.

There are multiple approaches that could be used to efficiently generate 2-D structured OTFS based reference signals for a given Delay-Doppler spread and allowed channel overhead. Three different approaches are disclosed in the present document: (1) Delay-Doppler packing of reference signals, (2) Time-frequency packing of reference signals, and (3) Latency-sensitive packing of reference signals.

Various embodiments could implement a relaxed version of any of these approaches and/or combinations of the approaches depending on usage scenarios and/or limitations such as backward compatibility with an existing communication protocol, simplicity of implementation, etc.

(1) Delay-Doppler Packing Reference Signals

The Delay-Doppler Packing reference signals can be generated as follows. The reference signal generation may be subject to an allowed overhead, which represents the amount of transmission resources allocated to the reference signals as a fraction of the total transmission resources.

The first step chooses, or selects, the finest t-f pilot lattice (smallest N and M) that meets the allowed overhead.

The second step squeezes, or packs, in the continuous Delay-Doppler torus associated with the selected pilot lattice, as many pilots as possible. In some embodiments, the pilots may be spaced as sparsely as possible while considering the ability of receivers to achieve good enough pilot separation and channels estimation for the expected, or target, delay and Doppler spreads of the channels.

The third step transforms the Delay-Doppler plane to the t-f plane. The transformation may be achieved using a 2D symplectic Fourier transform. Alternatively, or additionally, the pilots can also be generated directly in the t-f plane.

The fourth step may apply an n×m window to create the n×m discrete intervals occupied by the t-f signals.

Some of the parameters that will have an impact on how many pilots can be supported by a given pilot torus are: the size of the pilot observation window (selection of values of n and m), the delay and Doppler spreads of the channel, and the receiver implementation (e.g. t-f window size and shape, interpolation and pilot separation algorithms). A large enough t-f window (large n and m) will allow optimal packing of up to $NE_D$ pilots:

$$N_{DD}^P = \lfloor C_\tau^P/\Delta_\tau \rfloor \cdot \lfloor C_\nu^P/\Delta_\nu \rfloor \quad (10)$$

where $\lfloor x \rfloor$ is the largest integer smaller than x, $\Delta_r$ is the delay spread of the channel, and $\Delta_v$ is the Doppler spread of the channel.

Figure 4:
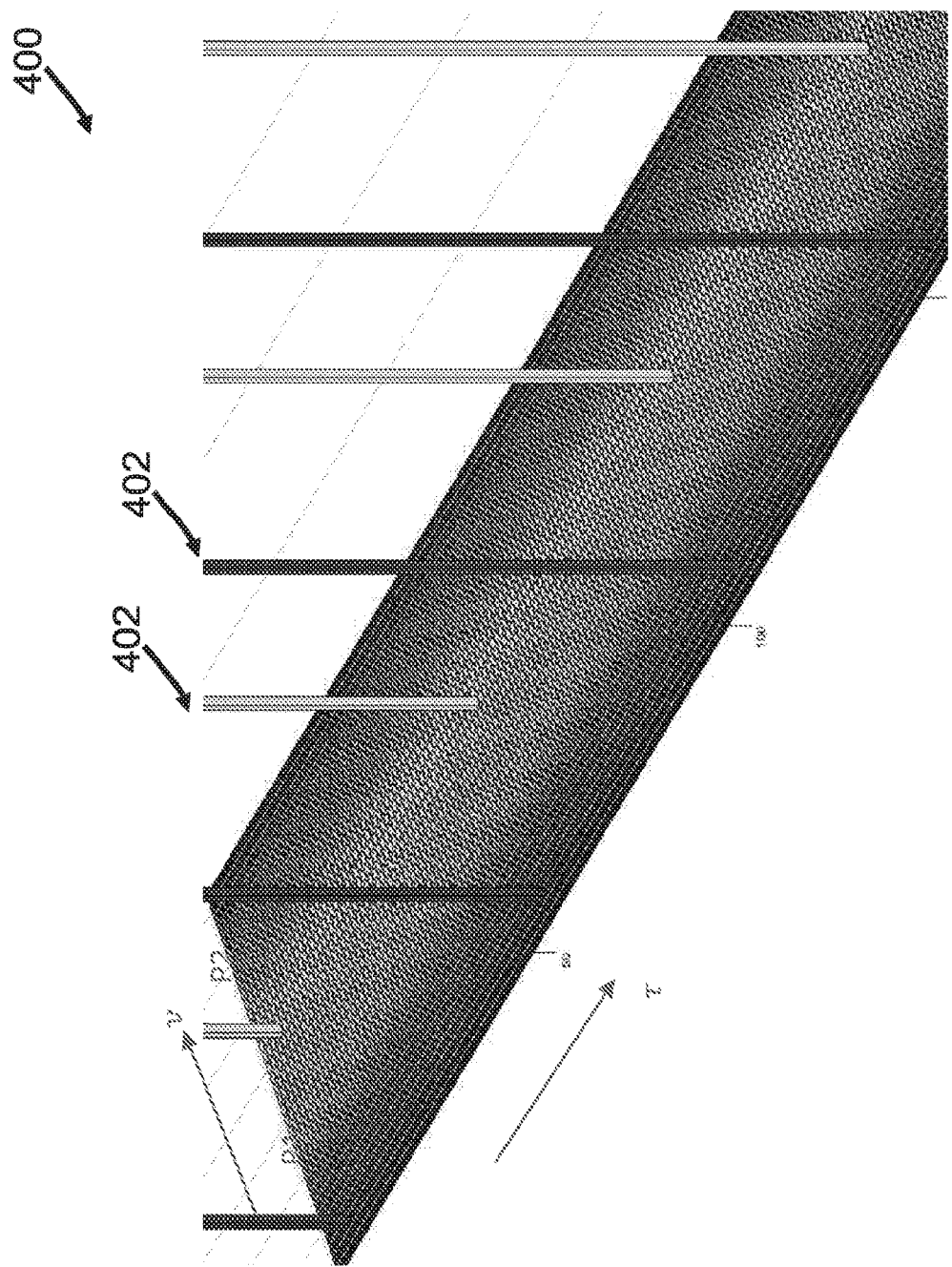
FIG. 4 shows an example of packing of 8 pilots (4×2) in the Delay-Doppler plane.

FIG. 4 shows an example spectrum 400 in which 8 reference signals (two of which have been identified as 402) are packed in the Delay-Doppler plane.

Example

The following example shows how one can use the Delay-Doppler Packing to generate a large number of reference signals with low overhead in an enumeration similar to the LTE enumeration.

Assume the following: The Channel has a bandwidth of 10 Mhz, Delay spread is $\Delta_r$=5 us, Doppler spread is $\Delta_v$=300 Hz ptp (150 Hz peak).

The Data Lattice (see (1)) may be constrained to have dt=66.67 us and df=15 Khz, with an allowed overhead: <7%

For such a case, a Delay-Doppler Packing solution may be provided as follows.

To meet the allowed overhead requirement, one solution can be to assign every 15$^{th}$ lattice point in the time domain and all the lattice points in the frequency domain to the reference signals, resulting in the following Delay-Doppler Packing:

Pilot Lattice (see (2)): N=15, M=1.
Associated Pilot torus:
Delay circumference: $C_\tau^P$=1/(Mdf)=66.67 us
Doppler circumference: $C_v^P$=1/(Ndt)=1000 Hz
An optimal packing with a large t-f window will support up to the following number of pilots:

$$N_{DD}^P = \lfloor C_\tau^P/\Delta_\tau \rfloor \cdot \lfloor C_v^P/\Delta_v \rfloor = \lfloor 66.67/5 \rfloor \cdot \lfloor 1000/300 \rfloor = 13 \cdot 3 = 39 \quad (11)$$

For the purpose of this example it is assumed that the implementation uses a Raised Cosine (RC) filter in both the transmitter and the receiver with the following Tx/Rx windows:

Number of time samples: 50 (n=36, and additional 14 for the RC filter)
Number of frequency samples: 626 (m=500, and additional 126 for the RC filter)
Pilot packing: For this example, limit the number of pilots to 20 and stack them as follows:
Number of pilots in delay domain: 10
Number of pilots in Doppler domain: 2

The pilots will also be position with an offset of 4 lattice points in the delay dimension and in the middle of their allocated Doppler interval. This translates to the lattice point (5,9) for the first pilot.

Figure 5:
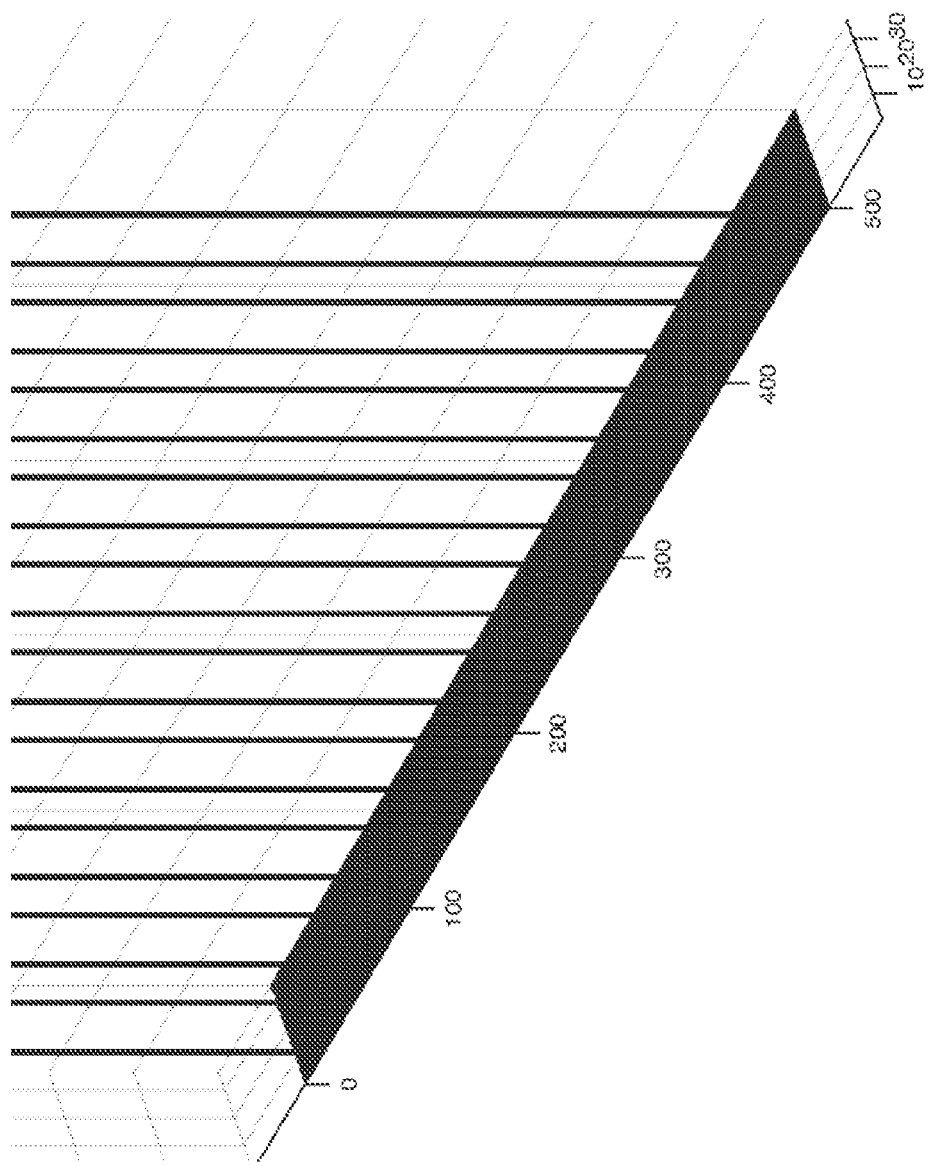
FIG. 5 shows an example of 20 pilots in the Delay-Doppler plane in lattice points (5+i50,9+j18), i=0 to 49, j=0,1.

FIG. 5 shows the 20 pilots in the Delay Doppler plane.

Figure 6:
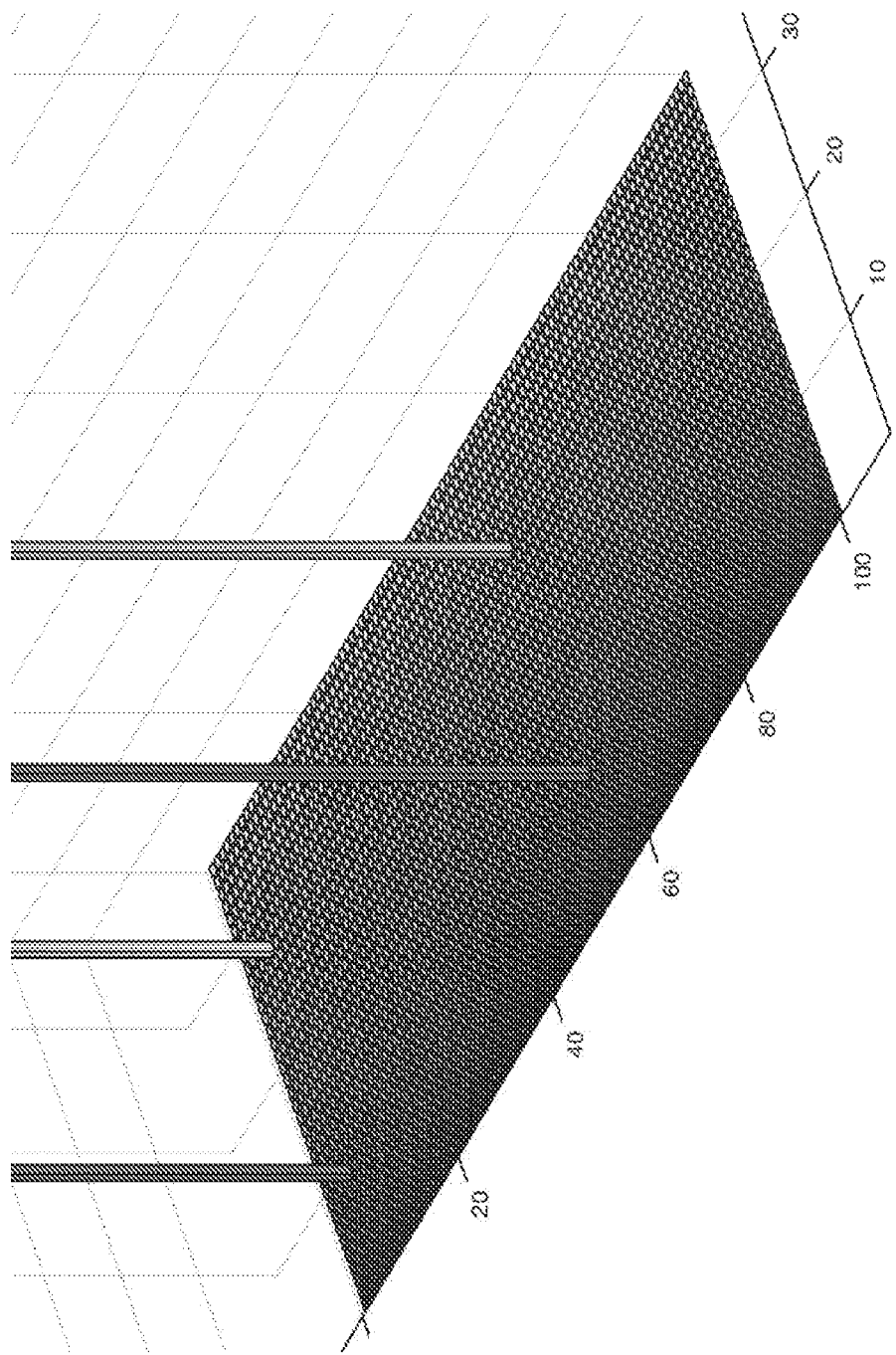
FIG. 6 is a zoomed in picture of the pilots in FIG. 5.

FIG. 6 zooms in to show the pilots in the first 100 lattice points in the delay dimension.

To show the worst case impact of the windows on the channel time-delay spread one can see the received pilots when the channel is represented by the following two paths (it is assumed that there is no direct path):

Path 1: Delay=5 us, Doppler shift=152.8 Hz
Path 2: Delay=0.067 us, Doppler shift=−152.8 Hz These two paths result in the received pilots being positioned exactly in the middle between lattice points causing the worst leakage of the receive window to neighboring lattice points, which represents the worst case for pilot separation.

Figure 7:
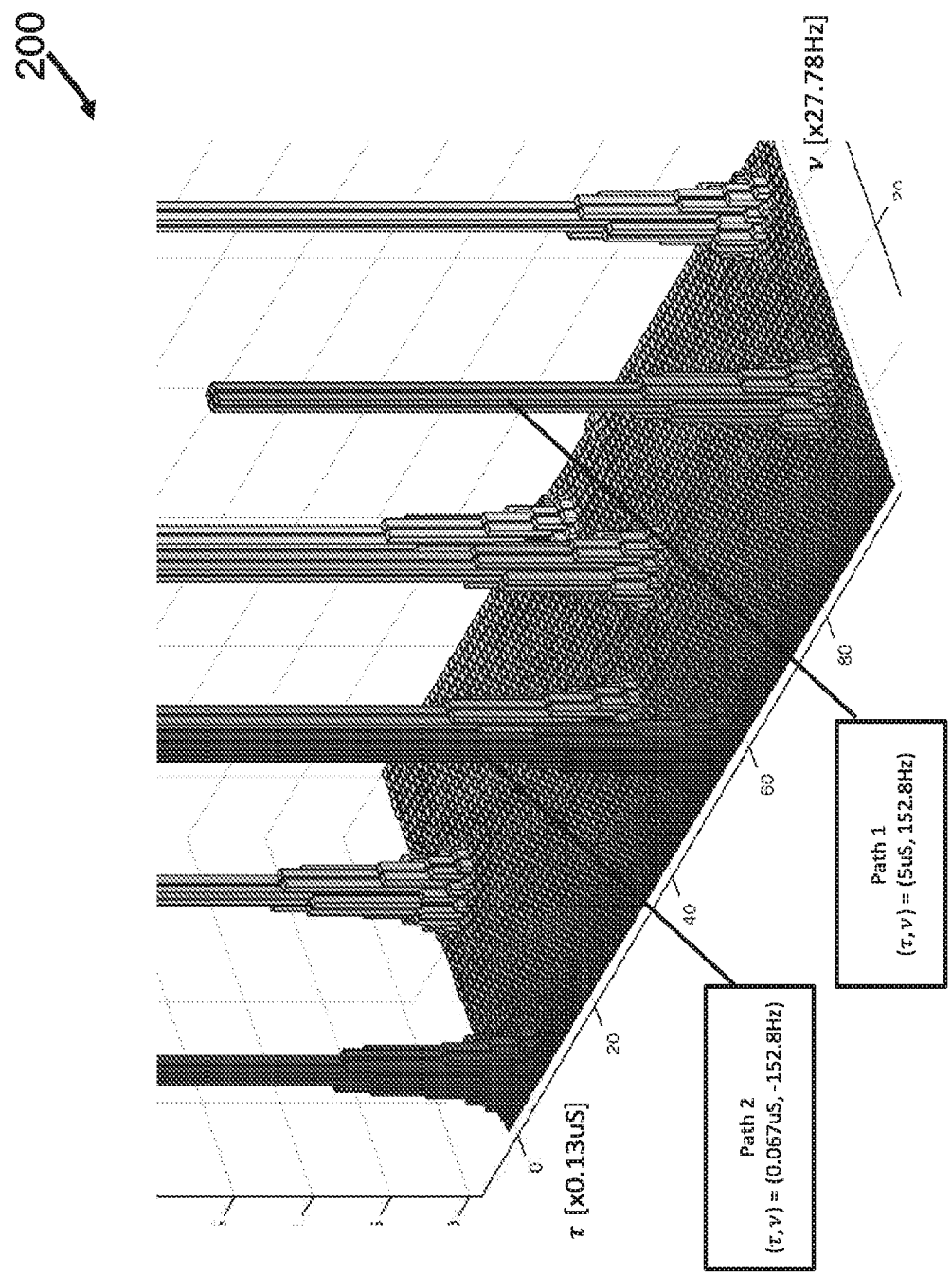
FIG. 7 shows an example of received pilots after going through a channel with two delay-Doppler paths (showing 4 pilots).

FIG. 7 shows the received pilots in the Delay-Doppler plane (zoomed in to show only the pilots in the first 100 lattice points in the delay dimension).

Figure 8:
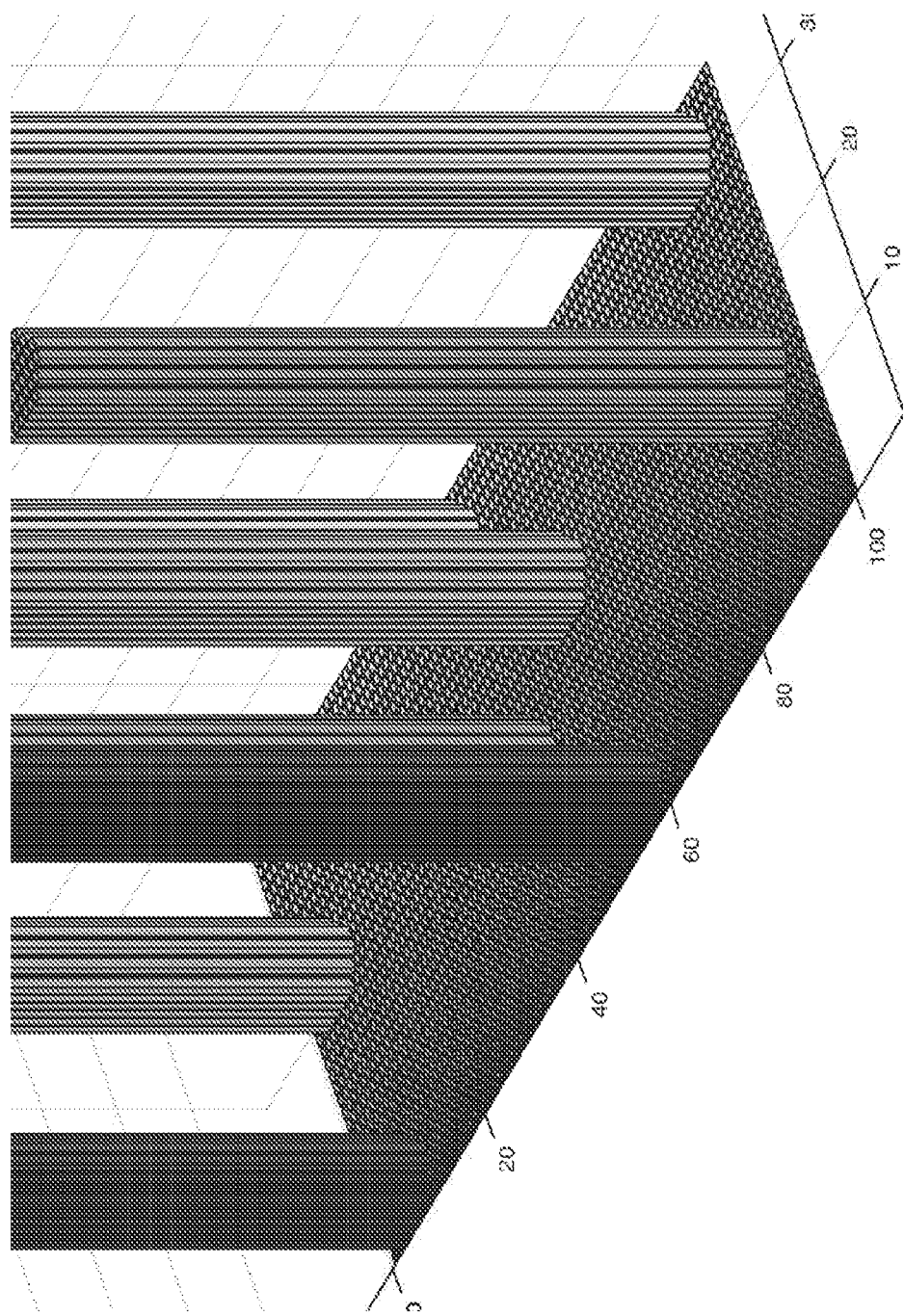
FIG. 8 shows an example of markers of received signal levels above −40 dB of received pilot peak.

FIG. 8 shows the lattice points in the Delay-Doppler plane where the received signal is above −40 dB from the highest level of the received pilot. As can be seen from FIG. 8, the received pilots' leakage to the surrounding pilots is lower than 40 dB below the pilot itself. Other receiver implementations may result in even lower leakage which will allow packing more pilots.

(2) Time-Frequency Packing Reference Signals

The Time-Frequency Packing reference signals are generated as follows:

Step 1 chooses the coarsest t-f pilot lattice (largest N and M) that can support a single channel estimation (one pilot).

Step 2 staggers as many of these pilot lattices as possible ($N_{TF}^G$) at equal distances between lattice points without violating the allowed overhead Step 3 puts a single pilot in the Delay-Doppler torus associated with the selected t-f pilot lattice.

Step 4 transforms the Delay-Doppler plane to the t-f plane (symplectic Fourier transform)

Step 5 creates $N_{TF}^G$ copies of the t-f plane and stagger them as stated in step 2.

Step 6 applies the n×m window to each of the t-f planes (may be a different window to each plane).

The size of the pilot window will have an impact on the quality of the channel estimation (a larger lattice will improve the quality of the channel estimation)

Figure 9:
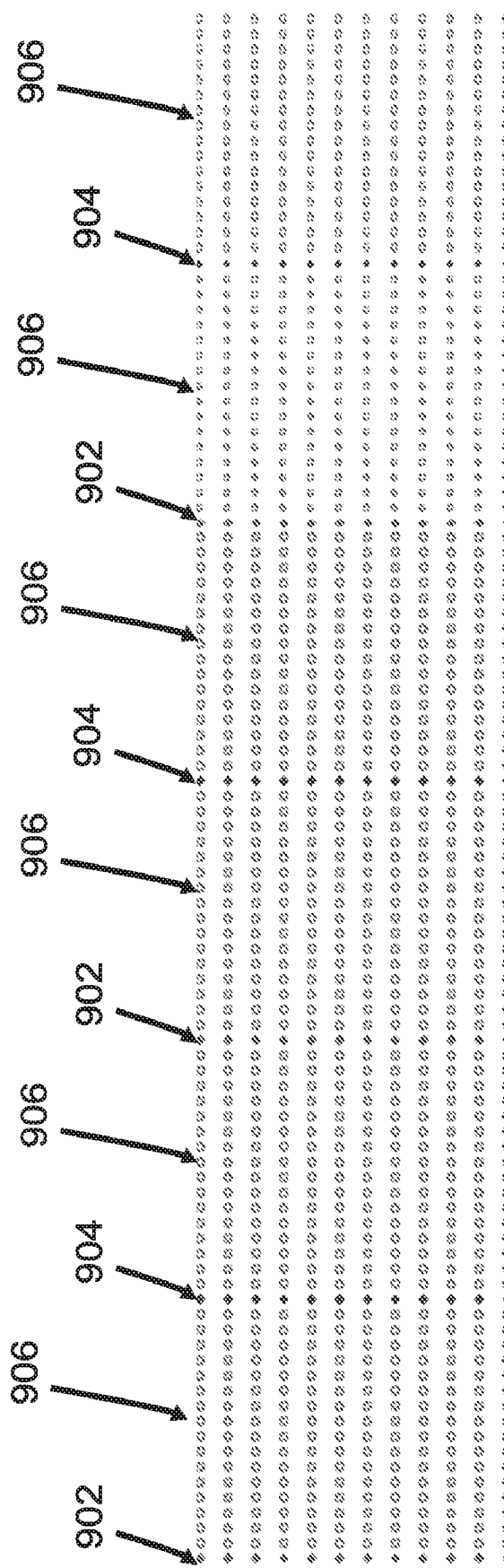
FIG. 9 illustrates an example of a t-f lattice showing the locations of two sampled Time-Frequency Packed reference signals multiplexed with data.

FIG. 9 shows an example of a Time-Frequency packing of two reference signals. In the depiction, two reference signals—902 and 904 are shown to occupy every 17th time point in the t-f plane, and every frequency point for the given time point. The time points occupied by reference signals 902 and 904 are interleaved with each other. The remaining t-f locations 906 are occupied by data (e.g., user data) transmissions, which may have different densities depending on the use, as can be visually seen from the density of the grids for locations 906.

(3) Latency Sensitive Packing Reference Signals

The Latency Sensitive Packing reference signals are generated as follows:

Step 1 chooses the finest t-f pilot lattice (smallest N and M) that meets the allowed overhead.

Step 2 chooses the smallest size pilot observation window in the time domain (smallest n) that supports one pilot in the Doppler torus (in the Delay Doppler plane).

Step 3 squeezes, or fits, in the Delay-Doppler torus, as many pilots as possible (spaced as sparsely as possible) while considering the ability of receivers to achieve good enough pilot separation and channels estimation for the expected delay and Doppler spreads of the channels.

Step 4 transforms the Delay-Doppler plane to the t-f plane, using, for example, a symplectic Fourier transform.

Step 5 applies the n×m window to the t-f plane.

Example

Adopting the same assumptions as in the previous example, example implementations can shorten the time interval of the window to pack only one pilot in the Doppler dimension. Assuming RC filters again, the solution may be as follows:

Number of time samples: 15 (n=9, and additional 6 for the RC filter)
Number of frequency samples: 626 (m=500, and additional 126 for the RC filter)
Pilot packing: An example implementation may limit the number of pilots to 10 and stack them only in the delay domain.

The pilots will be position with an offset of 4 lattice points in the delay dimension and in the middle of the Doppler interval. This translates to the lattice point (5,5) for the first pilot.

To show the worst case impact of the windows on the channel time-delay spread we show the received pilots when the channel is represented by the following two paths (no direct path):

Path 1: Delay=5 us, Doppler shift=166.7 Hz
Path 2: Delay=0.067 us, Doppler shift=−166.7 Hz These two paths result in the received pilots being positioned exactly in the middle between lattice points causing the worst leakage of the receive window to neighboring lattice points, which represents the worst case for pilot separation.

Figure 10:
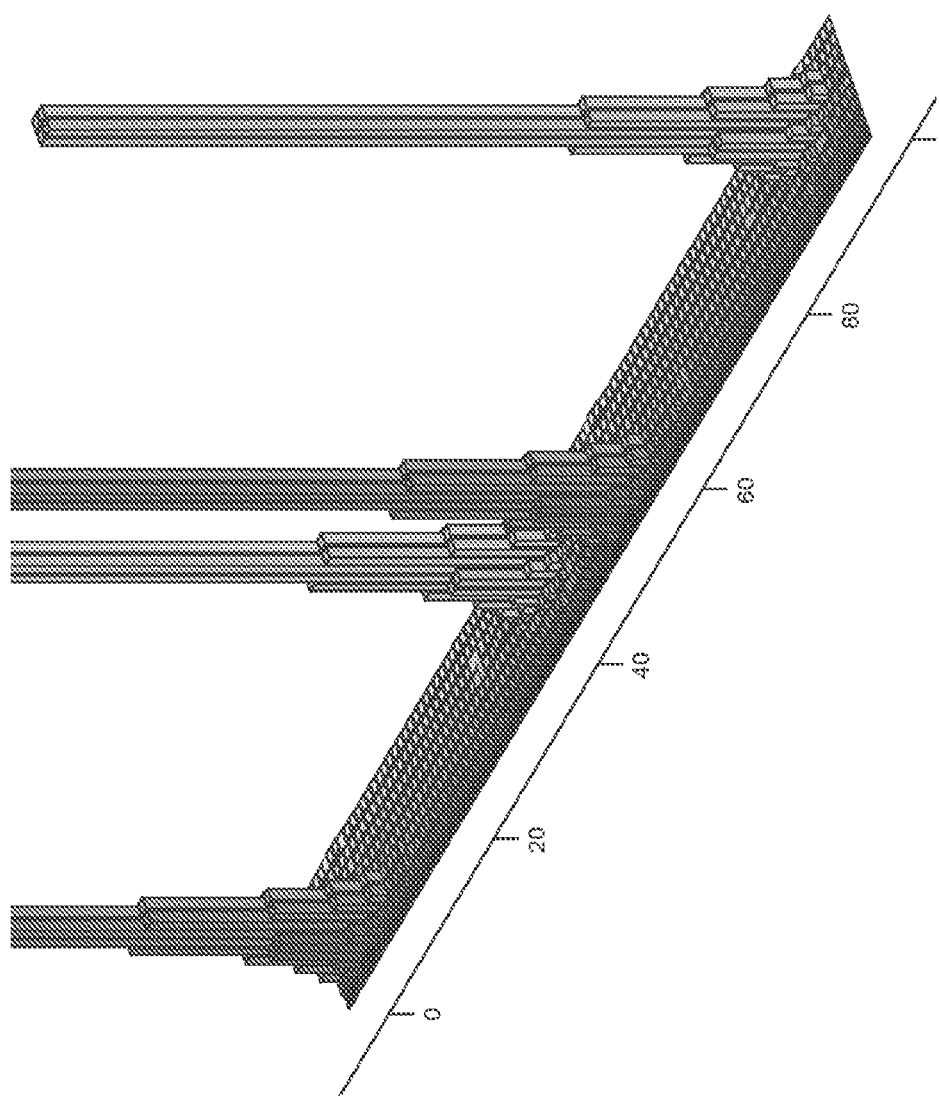
FIG. 10 shows an example of received pilots after going through a channel with two delay-Doppler paths (showing 2 pilots).
Figure 11:
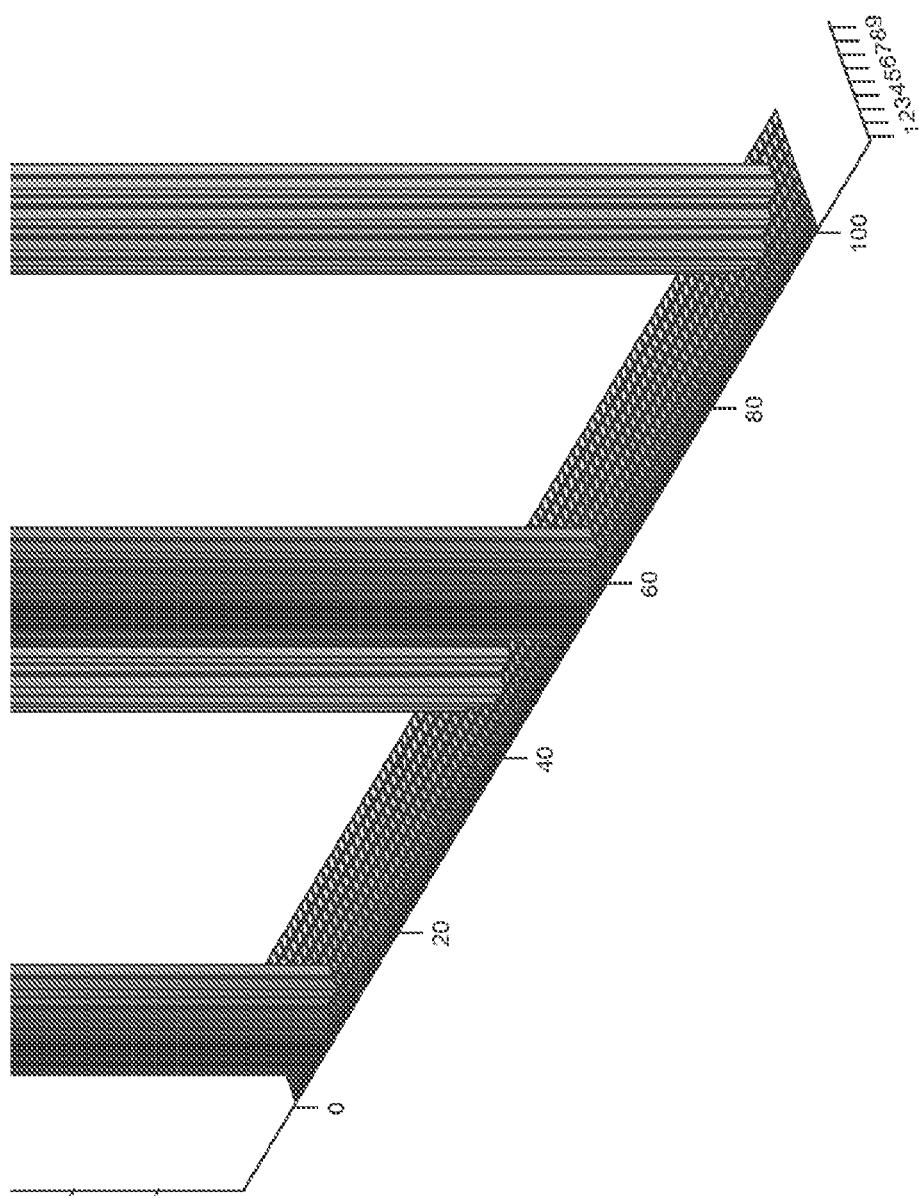
FIG. 11 shows an example of markers of received signal levels above −40 dB of received pilot peak.

The received pilots in the Delay-Doppler plane (zoomed in to show only the pilots in the first 100 lattice points in the delay dimension) are shown in FIG. 10. FIG. 11 shows the lattice points in the Delay-Doppler plane where the received signal is above −40 dB from the highest level of the received pilot.

2-D Non Structured Reference Signals

Non structured reference signals RE pilots that are generated on a Delay-Doppler torus with the same circumference as the data torus, transformed to the t-f plane and then restricted to a limited number of lattice points on the t-f lattice. The number of lattice points assigned to the reference signals, and their locations, will dictate how many pilots can be supported by that assignment.

Examples of OTFS Based Downlink Reference Signals

Cell-Specific Reference Signals

Cell-specific reference signals are transmitted in all downlink (DL) sub-frames and are available to all UEs in the cell.

FDD

Figure 12:
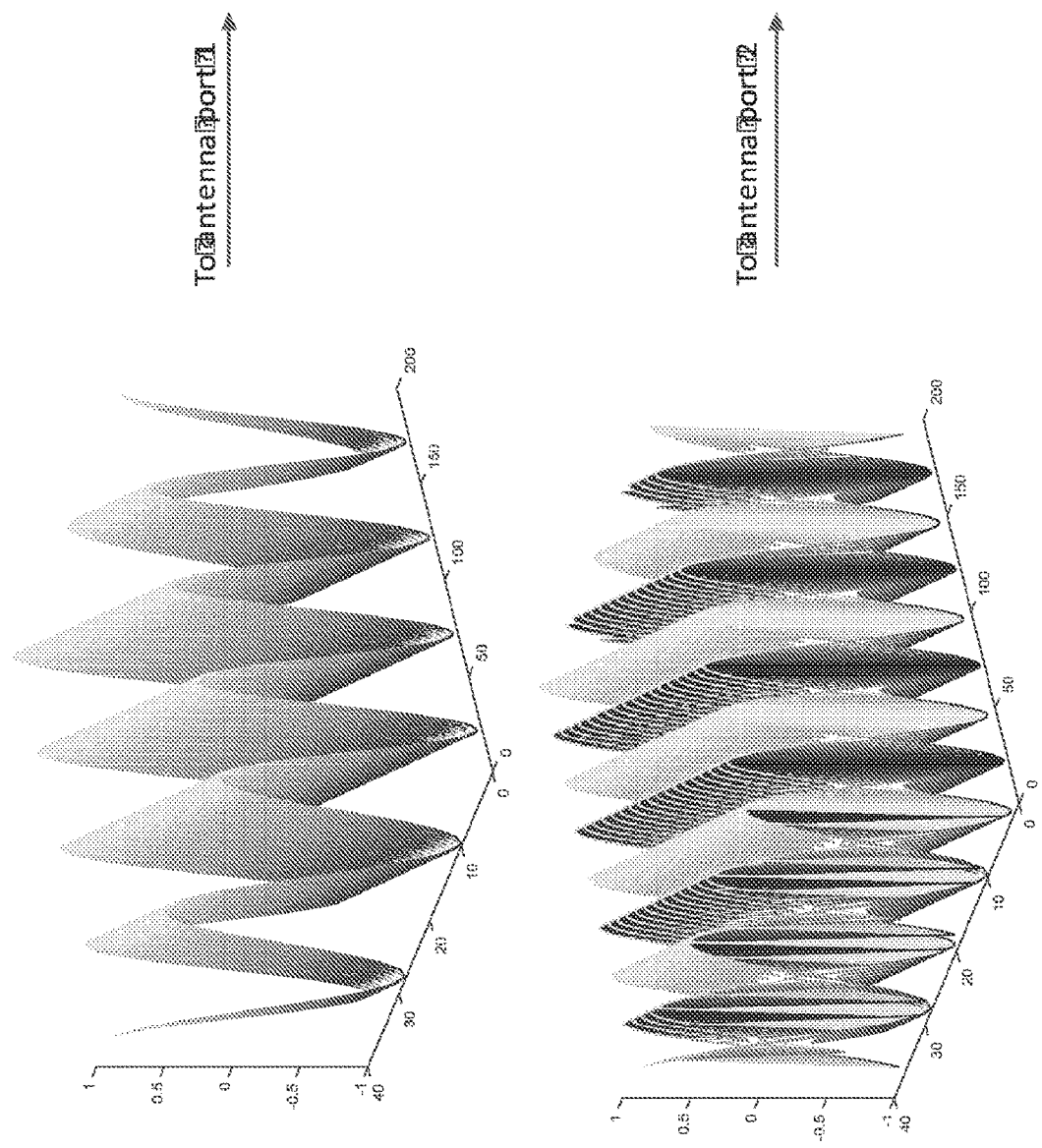
FIG. 12 shows real parts of pilots P1 and P2 in the t-f plane.

In FDD, since the DL transmissions are regular, implementations may use the Delay-Doppler Packing with the minimal overhead which allows packing a number of pilots equal to the number of antenna ports used by the eNodeB. Implementations may also transmit the pilots continuously (infinite lattice in the time domain). Each pilot may be transformed from the Delay-Doppler plane to the t-f plane separately and sent to its antenna port (see FIG. 12). The receiver will apply the appropriate window to get the required separation between the different pilots and good enough interpolation from the pilot lattice to the data lattice in the t-f plane. Transmitting the pilots continuously should not impact the data latency as the receiver can implement a sliding t-f window starting from the time it powers up, collect pilot information continuously, and be ready to estimate the channel when it needs to receive control information or data. The number of transmitted pilots and their location in the Delay-Doppler plane should be made known to the UEs. The size and shape of the t-f window at the receiver is implementation specific and need not be specified.

Another option is to use the Time-Frequency Packing. Such embodiments will result in higher latency compared to the Delay-Doppler Packing. This is due to the fact that the distance between the lattice points of the Time-Frequency Packing in the time dimension is larger (see Figure FIG. 4), and assuming the receiver requires at least one sample point of the received pilot after the data (for the interpolation of the channel response).

TDD

In TDD, the regularity of the DL transmissions depends on the frame size. In LTE the shortest periodicity of DL transmissions is 5 ms (half the frame size) which, if used as the lattice points of the time domain in the t-f plane, results in a Doppler circumference of the pilot torus of 200 Hz (⅕ ms). This translates to the ability to estimate channels with a Doppler spread of no more than 200 Hz. If shorter DL periodicity is supported, larger Doppler spreads (or more pilots) can be supported using the 2-D structured reference signals.

UE-Specific Reference Signals

UE-specific reference signals are only sent to specific UEs when the eNodeB transmits data to the UEs. These reference signals are transmitted when the eNodeB uses an antenna port which is different than the cell-specific antenna ports (e.g., when the eNodeB uses a UE specific beam forming when sending data to the UE). In this case the reference signal can only be sent within the frequency band and time assigned to the UE specific transmission.

In some embodiments, the reference signals described herein can be used for the UE-specific reference signals. The type selected will depend on which t-f lattice points are available for the reference signals, as well as the frequency width and length of the transmission. As an example, a wider bandwidth transmission will enable sending multiple pilots which can be used to support multiple beams to the same UE.

The 2-D non structured reference signals could be used to send one or more pilots on the currently defined LTE UE-specific RS arrangements for any number of antenna ports.

Examples of OTFS Based Uplink Reference Signals

Demodulation Reference Signals (DM-RS)

In some embodiments, the reference signals described herein can be used for the demodulation reference signals. The type selected will depend on which t-f lattice points are available for the reference signals, as well as the frequency width and length of the transmission. As an example, a wider bandwidth transmission will enable sending multiple pilots which can be used to support multiple beams.

2-D non structured reference signals could be used to send one or more pilots on the currently defined LTE demodulation RS arrangement.

Sounding Reference Signals (SRS)

Sounding reference signals can be regular and hence it is proposed to use the Delay-Doppler Packing approach to maximize the number of UEs simultaneously sending pilots for a given delay spread. To minimize the length of time for estimating the channel, one could choose Latency-Sensitive Packing using the maximum size lattice interval in the frequency dimension.

Examples of Implementations in Legacy Networks

As a specific example, the techniques described herein can be used for packing pilots for downlink transmission in LTE 4G systems. The pilots are placed in the time-frequency resources that are designated today for use by pilots aimed at each individual mobile UE (User Equipment) according to the specification 3GPP-30.211 release 12, clause 6.10.3. Those pilot signals are generally provided in order to assist the UE at estimating the channel and demodulating the transmitted data. In one advantageous aspect, the pilot packing can be performed while still maintaining compatibility with the LTE system. In other words, only transmission resources expected by the receivers to carry pilot signals are used for transmitting pilot signals.

Some embodiments described herein make more efficient use of the available pilot resources. This benefit can be used in two different ways:

More pilots can be packed in the same available resources allowing for more antennas in the system, and/or The same amount of pilots/antennas can be used but the system can be made more robust to Doppler effects and channel time variations LTE Scheme The LTE system transmits data to each specific UE in the downstream in bursts of 1 msec length comprising of 14 OFDM symbols (for normal cyclic prefix length operation). The subcarrier allocation for that UE can be in blocks of 12 subcarriers.

Figure 13:
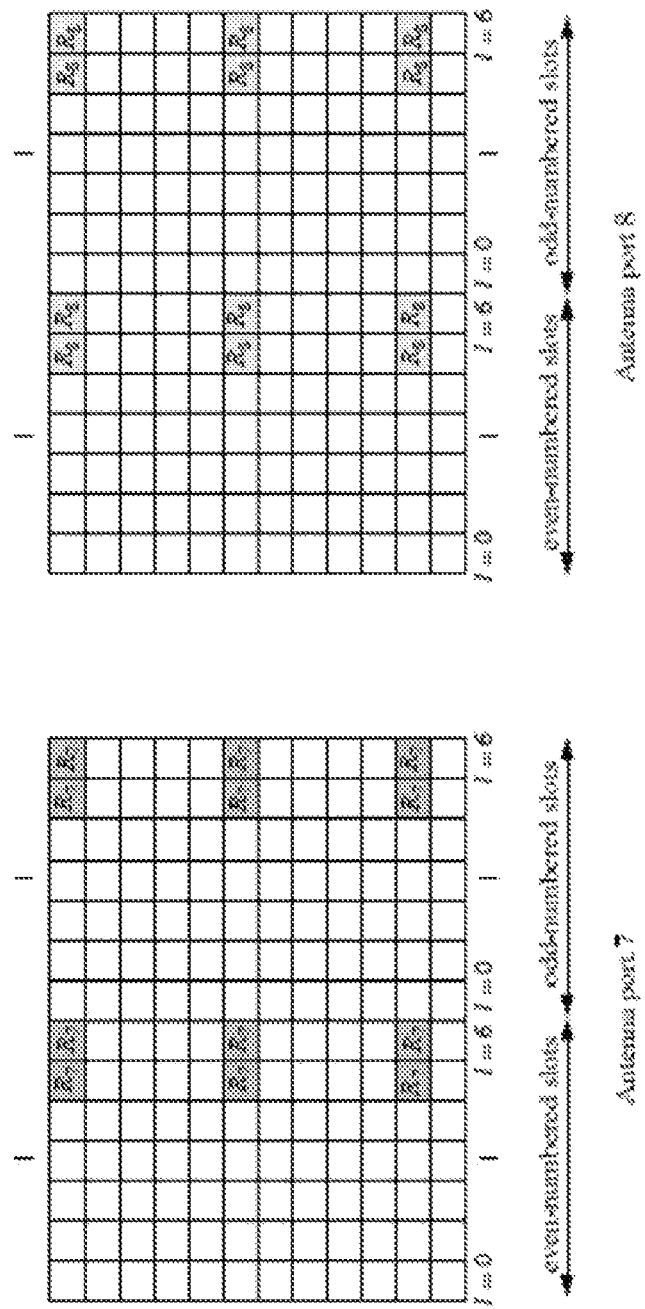
FIG. 13 shows example pilot locations where two antenna ports can be multiplexed

FIG. 13 shows the allocation of pilot subcarriers for the first and second antenna ports. An antenna port can be a single antenna or some unique linear combination of multiple antennas. These particular ports have the names Port 7 and Port 8 in 3GPP-30.211 release 12. Notice that the two ports occupy the same Resource Elements (or subcarriers). An orthogonal Hadamard code of length two is used to separate the two ports. The code is applied to neighboring resource elements.

Figure 14:
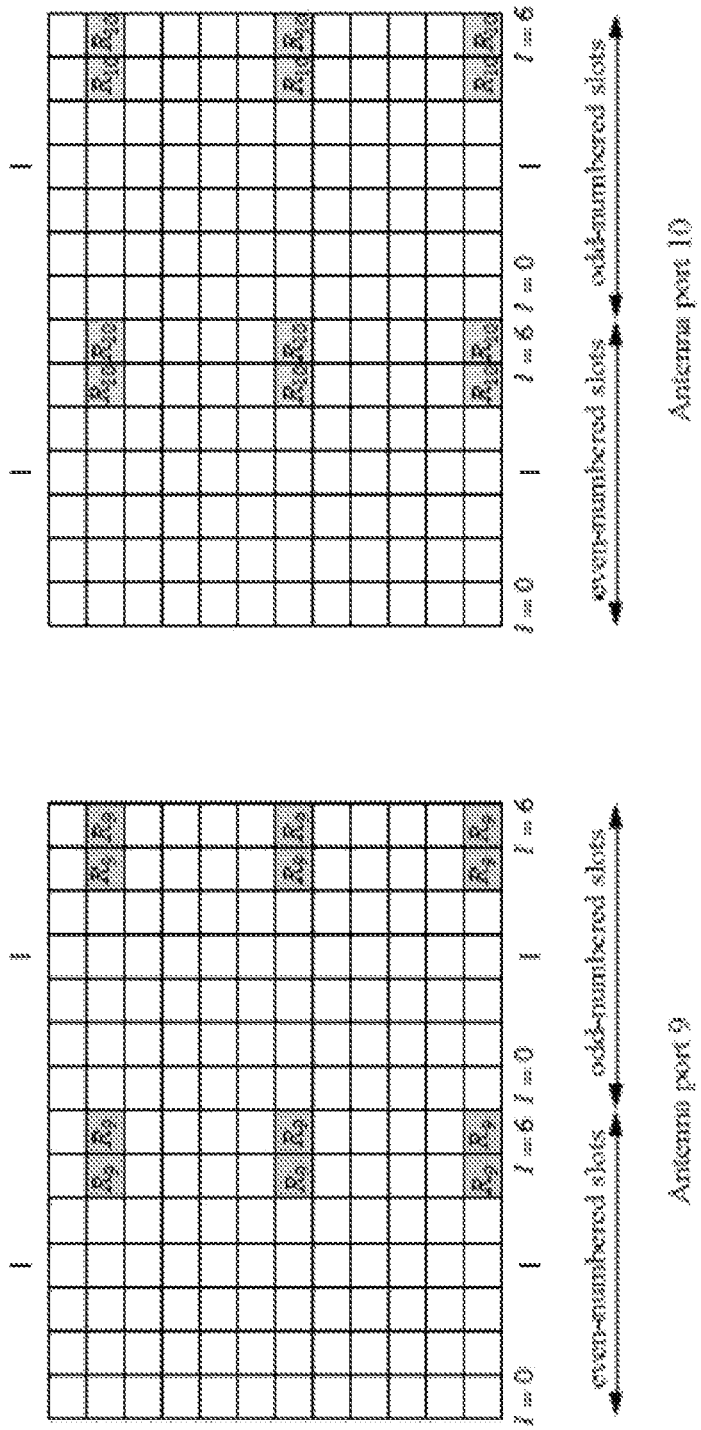
FIG. 14 shows examples of additional Pilot Locations Where Two Additional Antenna Ports Can be Multiplexed.

FIG. 14 illustrates the pilot locations for an additional two antenna ports. Notice that the locations of FIG. 14 are shifted by one position with respect to the locations of FIG. 13 and thus avoid interference.

When more antenna ports are required, a code of length four is used in FIG. 13 across the time dimension, this way allowing the packing of pilots for four antenna ports. In the same manner four additional antenna ports can be accommodated in the pilot positions of FIG. 14, allowing for a maximum of eight antenna ports. In the LTE specification they are enumerated as Antenna Port 7-Antenna Port 14 and use the codes shown in Table 1.

TABLE 1

Pilot Multiplexing Code

| Antenna port p | $[\overline{w}_p(0)\ \overline{w}_p(1)\ \overline{w}_p(2)\ \overline{w}_p(3)]$ |
| --- | --- |
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Limitations of LTE Scheme

As seen from Table 1, the LTE specification uses orthogonal Hadamard codes to multiplex up to eight antenna ports in two groups of four ports each. However, the Hadamard code orthogonality is generally lost after the pilots have propagated through the wireless channel. LTE systems attempt to resolve this in two ways. In the current LTE specification, no code multiplexing is allowed across the frequency dimension where the channel frequency response can significantly impair orthogonality. Code multiplexing is used across the time dimension, but is only used in situations where the channel is approximately time invariant within the 1 msec transmission time interval (low Doppler case). Then code orthogonality is likely to be preserved.

Thus, in LTE, no antenna ports can be multiplexed across the frequency domain. In LTE, antenna port multiplexing is only possible across the time domain for low mobility UEs.

In some embodiments, the Hadamard orthogonal codes of Table 1 can be replaced with orthogonal codes based on complex exponentials. One benefit of using complex exponentials is that when the pilot signals propagate through a frequency selective channel the orthogonality is not significantly impaired.

The complex exponential codes need not be limited to the frequency dimension; in fact they can be expanded to 2D codes covering both the frequency and time dimensions. For example, in some embodiments, OTFS based reference signals may be used. Similarly, when the pilot signals travel through a time selective channel, the orthogonality is not significantly impaired.

A pilot that is represented by a complex exponential with linear phase of slope (frequency) $\tau_0$ in the frequency dimension can also be thought of as a delta with delay $\tau_0$ in the associated Fourier transform domain, called the delay domain. Similarly a pilot that is represented by a complex exponential with linear phase of slope (frequency) $v_0$ in the time dimension can also be thought of as a delta with delay $v_0$ in the associated Fourier transform domain, which may be called the Doppler domain. A code that multiplies the pilot signals in the time-frequency domain can then be defined either in the time-frequency or in the delay-Doppler domains $$c(v, \tau) = \delta(v_0, \tau_0) \leftrightarrow C(k, l) = e^{-j(\frac{2\pi}{K}kv_0 - \frac{2\pi}{L}l\tau_0)} \quad (12)$$

where K, L are the time and frequency dimensions of the received burst. In LTE, K=14 OFDM symbols and L is a multiple of 12.

When the signal propagates through the channel, each reflected path adds a two dimensional linear phase to the complex exponential code with slopes determined by the delay and Doppler frequency offset of that path. Equivalently, each reflected path adds a copy of $\delta(v_0, \tau_0)$ shifted in both the delay and Doppler dimensions. If however, the pilot codes are selected to be far apart in the delay-Doppler domain (more than the maximum delay and Doppler spread of the channel), then the orthogonality is preserved through the channel effects.

At the receiver, strict orthogonality of the codes may not be preserved due to the narrowband (and time limited) nature of the reception. A two-dimensional sinc function spreads each shifted copy of $\delta(v_0,\tau_0)$. However, recovery of the pilot and channel information is still possible, not only on the resource elements (subcarriers) the pilots are transmitted on, but also on the data resource elements via interpolation. Using techniques such as Minimum-Mean-Square and other pilot separation and interpolation methods, a receiver can recover the channel and suppress interference from other pilots due to sinc-type signal leakage.

Example Benefits

By using OFTS based multiplexing codes, the same number of antenna ports (eight) can be packed in the resources of FIG. 13 and FIG. 14, but the system can be robust to Doppler shifts of up to at least 200 Hz. Alternatively, for low Doppler scenarios, up to twice the number of antenna ports can be packed in the same resources.

Figure 16:
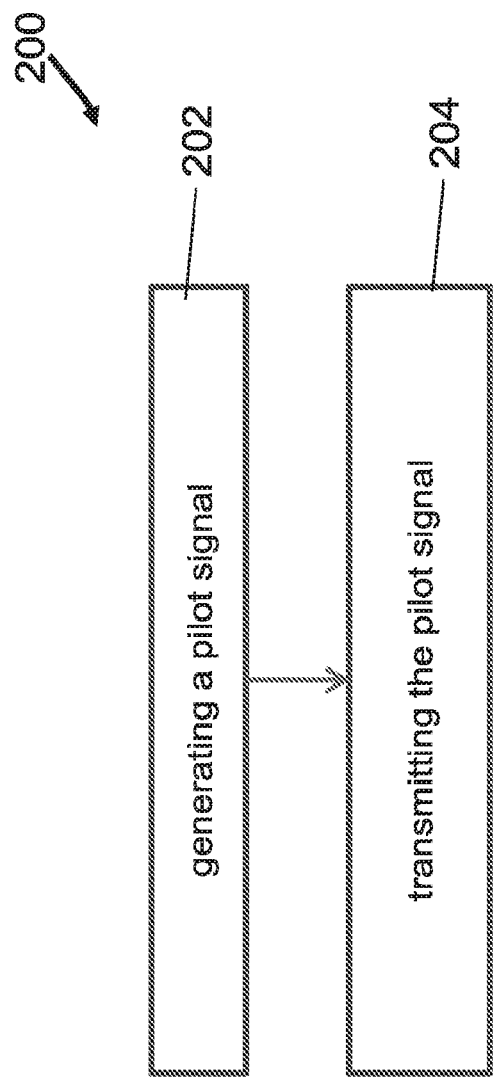
FIG. 16 shows a flowchart of an example wireless communication transmission method.

FIG. 16 is a flowchart for an example method 200 of wireless communication. The method 200 includes generating a pilot signal that is represented using a complex exponential signal having a first linear phase in a time dimension and a second linear phase in a frequency dimension (202) and transmitting the pilot signal over a wireless communication channel using transmission resources that are designated for pilot signal transmission in a legacy transmission network (204). In some embodiments, the legacy network is an LTE network (any of the various releases of the LTE specification). The pilot signal may occupy resource blocks (RBs) that are pre-designated in LTE for use by pilot signals. As described in this document, pilot signal packing may be achieved by using one of at least three techniques—time-frequency domain packing, delay-Doppler domain packing or latency sensitive packing. In some embodiments, the method 200 may be implemented to generate reference signals such as UERS or DMRS or CRS.

In some embodiments, a wireless data transmission apparatus may include a module for generating a pilot signal that is represented using a complex exponential signal having a first linear phase in a time dimension and a second linear phase in a frequency dimension and a module for transmitting the pilot signal over a wireless communication channel using transmission resources that are designated for pilot signal transmission in a legacy transmission network. In some embodiments, the legacy network is an LTE network (any of the various releases of the LTE specification). The pilot signal may occupy resource blocks (RBs) that are pre-designated in LTE for use by pilot signals.

Figure 17:
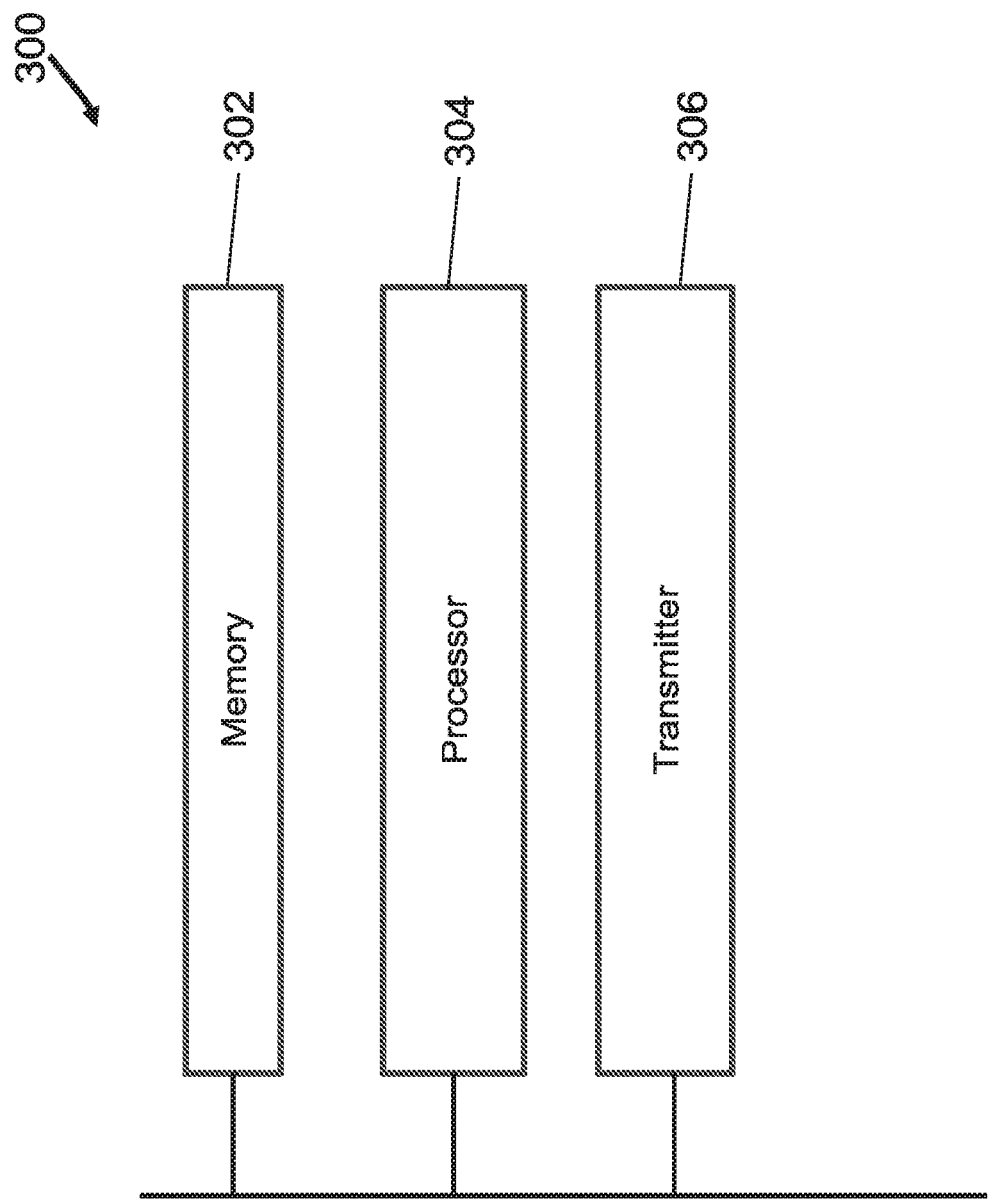
FIG. 17 shows a block diagram of an example of a wireless transmission apparatus.

FIG. 17 is a block diagram representation of an example of a wireless communication apparatus 300. The apparatus 300 includes a memory (302) storing instructions, a processor (304) and a transmitter (306) communicatively coupled to the memory and the processor; wherein the memory stores instructions for causing the processor to generate a pilot signal that is represented using a complex exponential signal having a first linear phase in a time dimension and a second linear phase in a frequency dimension. The transmitter transmits the pilot signal over a wireless communication channel using transmission resources that are designated for pilot signal transmission in a legacy transmission network. In some embodiments, the legacy network is an LTE network (any of the various releases of the LTE specification). The pilot signal may occupy resource blocks (RBs) that are pre-designated in LTE for use by pilot signals.

Figure 18:
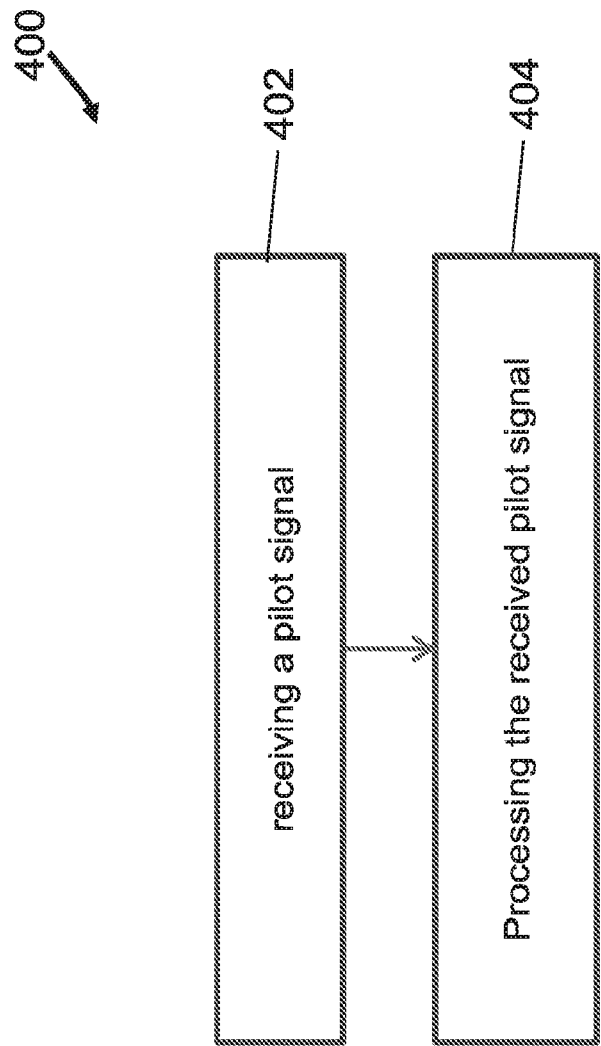
FIG. 18 shows a flowchart of an example method of receiving wireless signals.

FIG. 18 shows a flowchart for an example of a wireless communication method 400, implemented at a receiver. The method includes receiving a pilot signal that is represented using a complex exponential signal having a first linear phase in a time dimension and a second linear phase in a frequency dimension; wherein the pilot signal is transmitted over a wireless communication channel using transmission resources that are designated for pilot signal transmission in a legacy transmission network (402) and processing the received pilot signal to perform channel recovery and interference suppression (404). In some embodiments, the legacy network is an LTE network (any of the various releases of the LTE specification). The pilot signal may occupy resource blocks (RBs) that are pre-designated in LTE for use by pilot signals.

In some embodiments, a wireless data reception apparatus includes a module for receiving a pilot signal that is represented using a complex exponential signal having a first linear phase in a time dimension and a second linear phase in a frequency dimension, wherein the pilot signal is transmitted over a wireless communication channel using transmission resources that are designated for pilot signal transmission in a legacy transmission network and a module for processing the received pilot signal to perform channel recovery and interference suppression. In some embodiments, the legacy network is an LTE network (any of the various releases of the LTE specification). The pilot signal may occupy resource blocks (RBs) that are pre-designated in LTE for use by pilot signals.

Figure 19:
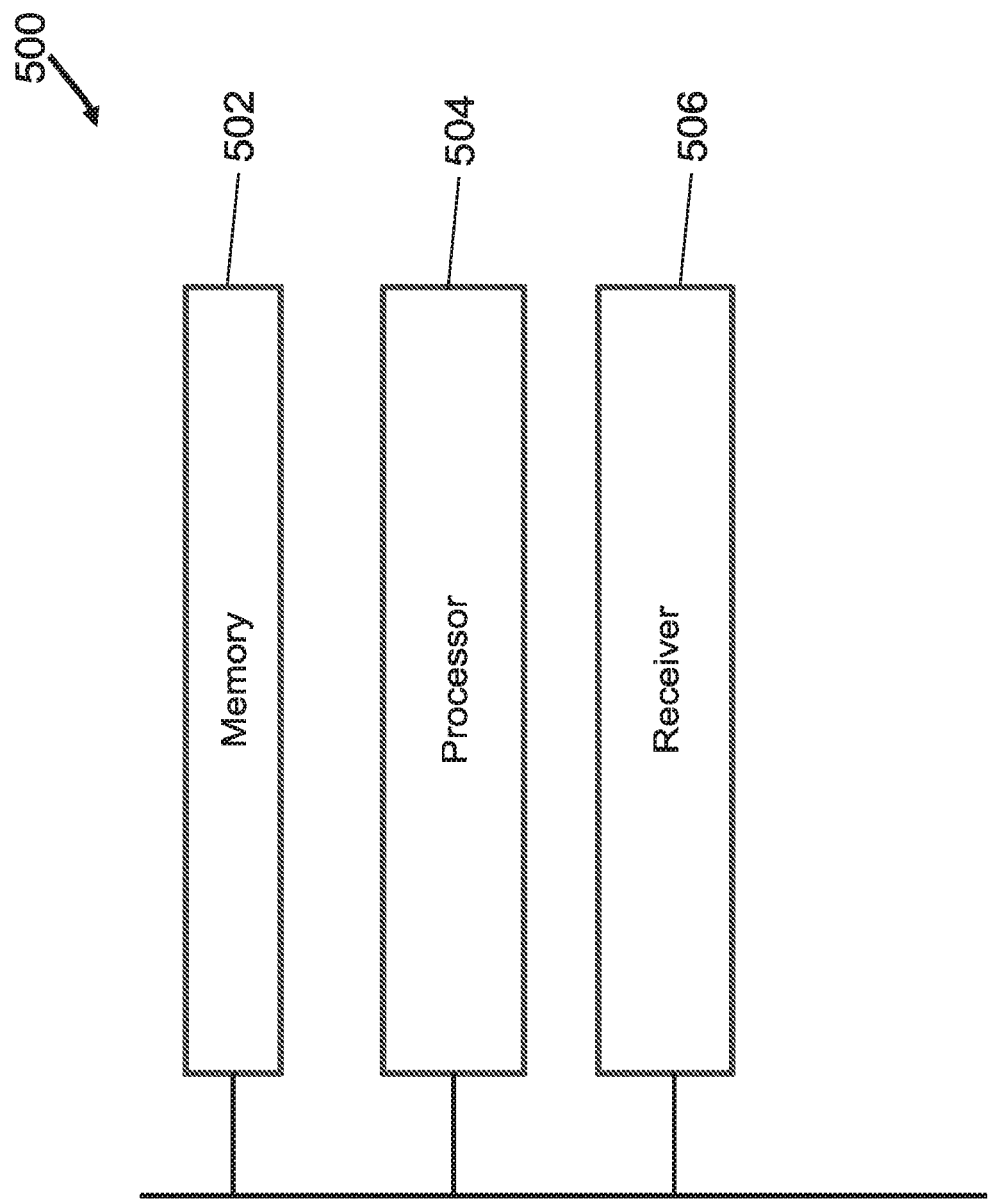
FIG. 19 shows a block diagram of an example wireless receiver apparatus.

FIG. 19 shows a block diagram of an example of a wireless communication receiver apparatus 500. The apparatus 500 includes a memory (502) that stores instructions, a processor (504) and a receiver (506), e.g., a wireless front end, communicatively coupled to the memory and the processor. The receiver receives a pilot signal that is represented using a complex exponential signal having a first linear phase in a time dimension and a second linear phase in a frequency dimension; wherein the pilot signal is transmitted over a wireless communication channel using transmission resources that are designated for pilot signal transmission in a legacy transmission network. The memory stores instructions for causing the processor to process the received pilot signal to perform channel recovery and interference suppression. In some embodiments, the legacy network is an LTE network (any of the various releases of the LTE specification). The pilot signal may occupy resource blocks (RBs) that are pre-designated in LTE for use by pilot signals.

With respect to methods 200, 400 and apparatus 300, 500, the pilot signal may be generated by representing the pilot signal in a time-frequency plane or a delay-Doppler plane. Furthermore, due to the mathematical properties of the pilot signals, the pilot signal occupying a given resource block may include at least two component pilot signals that are orthogonal with respect to each other. The pilot signal may be generated by applying a window having a finite dimension in each of the time dimension and the frequency dimension to the complex exponential signal.

Figure 20:
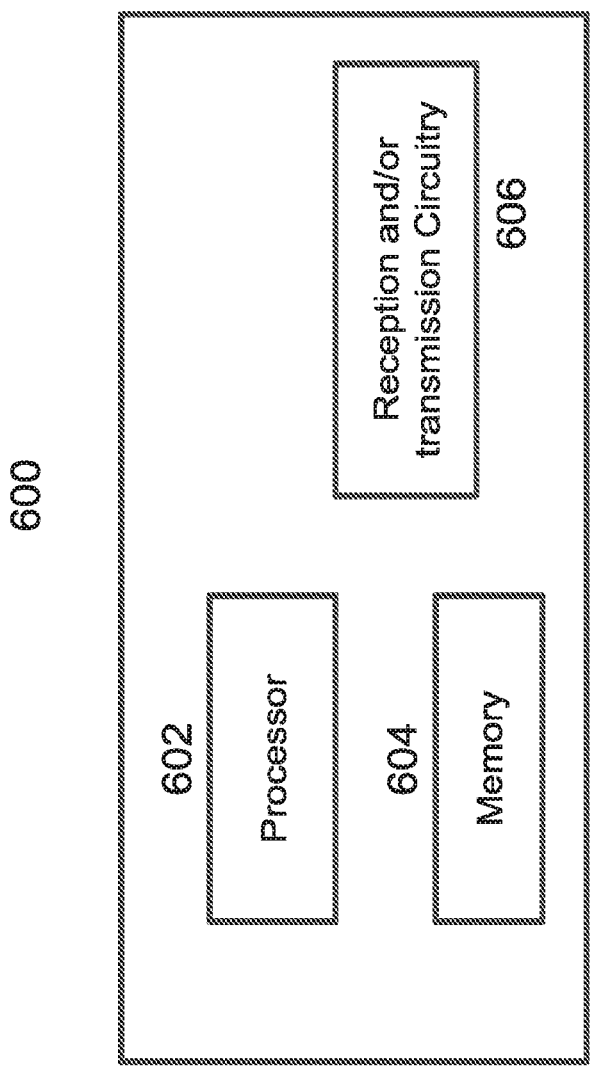
FIG. 20 shows an example of a wireless transceiver apparatus.

FIG. 20 shows an example of a wireless transceiver apparatus 600. The apparatus 600 may be used to implement method 400 or 200. The apparatus 600 includes a processor 602, a memory 604 that stores processor-executable instructions and data during computations performed by the processor. The apparatus 600 includes reception and/or transmission circuitry 606, e.g., including radio frequency operations for receiving or transmitting signals.

It will be appreciated that techniques for wireless data transmission and reception are disclosed using a pilot signal that is based on a complex orthogonal function.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for wireless communication, comprising:
   generating a pilot signal that is represented as a complex exponential signal having both a first linear phase in a time dimension and a second linear phase in a frequency dimension; and
   transmitting the pilot signal over a wireless communication channel using transmission resources that are designated for pilot signal transmission in a legacy transmission network,
   wherein the generating the pilot signal comprises generating the pilot signals by delay-Doppler domain packing by:
      selecting a time-frequency lattice that meets a target overhead allocation;
      packing a number of pilots in a torus corresponding to the time-frequency lattice, the number of pilots being selected to meet target delay and Doppler spreads of a channel in the legacy transmission network; and
      transforming the number of pilots in the torus into a delay-Doppler domain by applying a symplectic transform.

2. The method of claim 1, wherein the selecting the time-frequency lattice corresponds to selecting a finest available time-frequency lattice.

3. The method of claim 1, wherein the legacy transmission network comprises a long term evolution (LTE) network.

4. The method of claim 3, wherein the linear phase in the frequency dimension repeats every 14 symbols and the linear phase in the time dimension repeats at multiples of 12 time slots.

5. A method for wireless communication, comprising:
   generating a pilot signal that is represented as a complex exponential signal having both a first linear phase in a time dimension and a second linear phase in a frequency dimension; and
   transmitting the pilot signal over a wireless communication channel using transmission resources that are designated for pilot signal transmission in a legacy transmission network,
   wherein the generating the pilot signal comprises generating the pilot signals by time-frequency packing, including:
      choosing a time-frequency pilot lattice to support channel estimation by a receiver based on a single pilot signal;
      generating an arrangement of pilot signals by staggering multiple time-frequency pilot lattices with equal distance between lattice points to meet a target overhead;
      mapping the single pilot signal to a delay-Doppler torus associated with the time-frequency pilot lattice;
      transforming the single pilot signal in the torus into a delay-Doppler domain by applying a symplectic transform;
      creating the multiple time-frequency lattices and staggering the multiple time-frequency lattices; and
      applying a window function to each time-frequency plane.

6. The method of claim 5, wherein the choosing the time-frequency pilot lattice comprises choosing a coarsest possible time-frequency pilot lattice.

7. The method of claim 5, wherein the legacy transmission network comprises a long term evolution (LTE) network.

8. The method of claim 7, wherein the linear phase in the frequency dimension repeats every 14 symbols and the linear phase in the time dimension repeats at multiples of 12 time slots.

9. A method for wireless communication, comprising:
generating a pilot signal that is represented as a complex exponential signal having both a first linear phase in a time dimension and a second linear phase in a frequency dimension; and
transmitting the pilot signal over a wireless communication channel using transmission resources that are designated for pilot signal transmission in a legacy transmission network,
wherein the generating the pilot signal comprises generating the pilot signals by a latency sensitive pilot packing, including:
choosing a time-frequency pilot lattice that meets a target overhead;
selecting a smallest size pilot observation window in time domain to support one pilot signal in Doppler torus;
packing a number of pilots in a torus corresponding to the time-frequency lattice, the number of pilots being selected to meet target delay and Doppler spreads of a channel in the legacy transmission network;
transforming the delay-Doppler domain to the time-frequency domain by applying a symplectic transform; and
applying a window function in the time-frequency domain.

10. The method of claim 9, wherein choosing the time-frequency pilot lattice includes choosing a finest possible lattice.

11. The method of claim 9, wherein the legacy transmission network comprises a long term evolution (LTE) network.

12. The method of claim 11, wherein the linear phase in the frequency dimension repeats every 14 symbols and the linear phase in the time dimension repeats at multiples of 12 time slots.

13. An apparatus for wireless communication, comprising:
a processor; and
a transmitter communicatively coupled to the processor,
wherein the processor is configured to generate a pilot signal that is represented as a complex exponential signal having both a first linear phase in a time dimension and a second linear phase in a frequency dimension,
wherein the transmitter is configured to transmit the pilot signal over a wireless communication channel using transmission resources that are designated for pilot signal transmission in a legacy transmission network, and
wherein generating the pilot signal is based on delay-Doppler domain packing with the processor being further configured to:
select a time-frequency lattice that meets a target overhead allocation;
pack a number of pilots in a torus corresponding to the time-frequency lattice, the number of pilots being selected to meet target delay and Doppler spreads of a channel in the legacy transmission network; and
transform the number of pilots in the torus into a delay-Doppler domain by applying a symplectic transform.

14. The apparatus of claim 13, wherein the legacy transmission network comprises a long term evolution (LTE) network.

15. The apparatus of claim 14, wherein the linear phase in the frequency dimension repeats every 14 symbols and the linear phase in the time dimension repeats at multiples of 12 time slots.

* * * * *